United States Patent [19]
Grivel et al.

[11] Patent Number: 5,641,589
[45] Date of Patent: Jun. 24, 1997

[54] STORAGE CELL BATTERY UNIT EQUIPPED WITH A COOLING DEVICE

[75] Inventors: Tristan Grivel, Bordeaux; Claude Gilabert, Le Pian-Medoc; Francis Bonnaud, Salignac, all of France

[73] Assignee: Saft, Romainville, France

[21] Appl. No.: 550,233

[22] Filed: Oct. 30, 1995

Related U.S. Application Data

[62] Division of Ser. No. 143,748, Nov. 1, 1993, Pat. No. 5,510,207.

[30] Foreign Application Priority Data

Nov. 2, 1992 [FR] France .................. 92 13087

[51] Int. Cl.$^6$ .................................................. H01M 10/50
[52] U.S. Cl. ................................ 429/120; 429/176
[58] Field of Search ........................... 429/62, 120, 72, 429/176

[56] References Cited

U.S. PATENT DOCUMENTS 2,410,952  12/1946  Lighton .
3,110,633  11/1963  Bachmann .
3,246,689   4/1966  Remde et al. .
4,107,402   8/1978  Dougherty et al. ............. 429/120
4,738,906   4/1988  Sanders .
4,810,778   3/1989  Mizutani et al. .
5,212,025   5/1993  Shibata et al. ................. 429/120
5,432,026   7/1995  Sahm et al. .................... 429/120

FOREIGN PATENT DOCUMENTS 2635427  2/1978  Germany .
9210384 11/1992  Germany .

*Primary Examiner*—Stephen Kalafut
*Attorney, Agent, or Firm*—Sughrue, Mion, Zinn, Macpeak & Seas

[57] ABSTRACT

A storage cell battery unit equipped with a cooling device that uses a circulating fluid, said battery including a housing made of plastic and constituted by a case (6) and a cover (7) heat-sealed thereon, said storage cell battery being characterized by the fact that said cooling device includes two panels (12, 13) made of plastic and heat-sealed in fluid-tight manner to respective ones of two opposite walls (3, 2) of said housing, each of the panels cooperating with the corresponding wall to delimit a circulation compartment having an inlet orifice (14) and an outlet orifice (14) for said fluid at the top of the compartment.

6 Claims, 4 Drawing Sheets

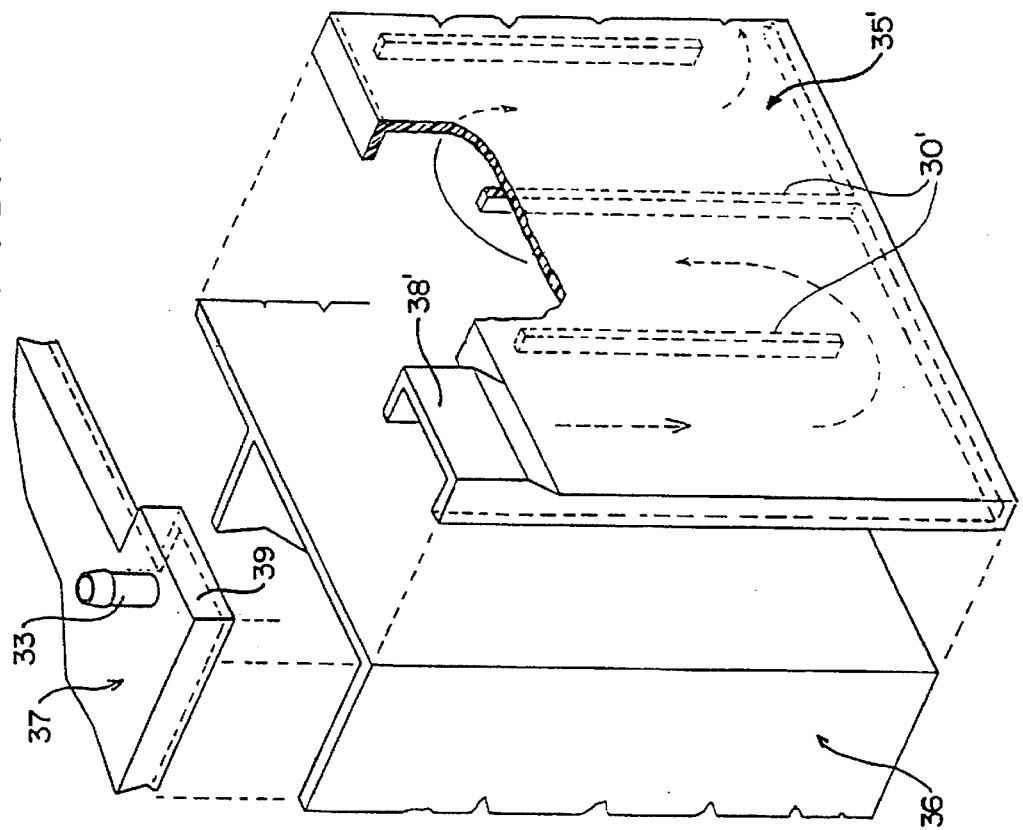
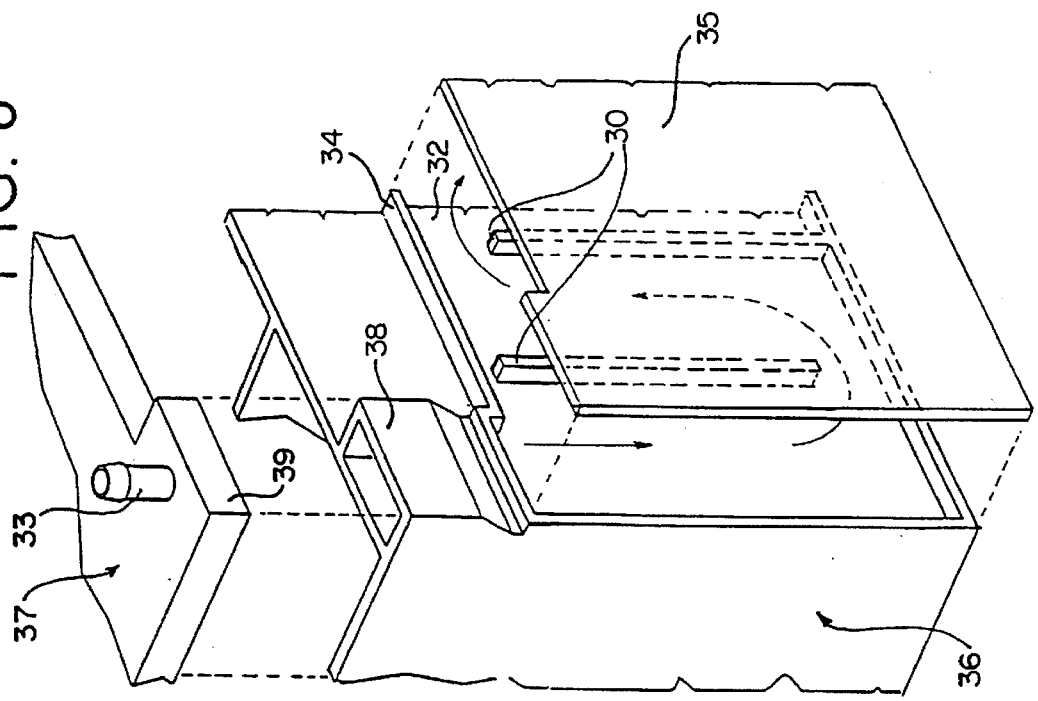

STORAGE CELL BATTERY UNIT EQUIPPED WITH A COOLING DEVICE

This is a divisional of application Ser. No. 08/143,748 filed Nov. 1, 1993 now U.S. Pat. No. 5,510,207.

The present invention relates to a storage cell battery unit equipped with a cooling device.

It is known that the different states of use of a storage cell battery (charge, overcharge, discharge) give rise to increases in temperature which modify the performance levels of the battery. In this way, a 6 volt, 100 Ah Nickel-Cadmium storage cell battery gives off about 450 kilojoules during a discharge at 100 amps.

This has the following drawbacks:

if the battery is recharged when hot, the capacity charged is less than the capacity that can be stored at ambient temperature;

if the battery remains at a high temperature, its separators may be degraded, thus reducing the life span of the battery; and when a plurality of battery units are associated together in series or in parallel, and when they are at different temperatures, the resulting discharge energy corresponds to the lowest performance levels, and there is a risk of inversion at the end of discharge; it is therefore advisable to make the temperatures of all the grouped-together batteries as uniform as possible; this type of problem applies particularly to powering electrical vehicles.

The means that are currently most commonly used are means causing air to flow between the battery units. In an electrical vehicle, in which the batteries are disposed at different locations for reasons of mass and of available space, it is extremely difficult to make the temperature properly uniform by using those means. Cooling is not very effective. In particular, the battery units must be spaced apart from one another in order to allow the air to flow, and this increases the amount of space required for the batteries.

It has also been proposed to place rectangular metal receptacles against at least two opposite outside faces of the battery unit, a cooling liquid, such as water, circulating in the receptacles. It has been found that such an installation is still too bulky, and does not remove heat sufficiently.

An object of the present invention is to provide a battery unit equipped with a cooling device that is both effective and compact, and that is particularly well-suited to having a large number of battery units associated together in parallel or in series.

The present invention therefore provides a storage cell battery unit equipped with a cooling device that uses a circulating fluid, said battery including a housing made of plastic and constituted by a case and a cover heat-sealed thereon, said storage cell battery being characterized by the fact that said cooling device includes two panels made of plastic and heat-sealed in fluid-tight manner to respective ones of two opposite walls of said housing, each of the panels co-operating with the corresponding wall to delimit a circulation compartment having an inlet orifice and an outlet orifice for said fluid at the top of the compartment.

In order to improve heat removal still further, the walls of the case that carry the panels can be chosen to be thinner than conventional walls; the mechanical strength of the housing is then provided by the panels themselves, which panels can be given a thickness that is suitable for this purpose.

Preferably, said wall and/or said panel is provided with a plurality of ribs that form baffles for the circulation of said fluid in said compartment.

The ribs are heat-sealed to the panel or to the wall during the operation of heat-sealing the panel to the wall.

By heat-sealing the ribs, the distortion of the panel under the effect of the pressure of the circulating fluid is limited.

The ribs may be vertical or sloping.

Preferably, for each of those of said ribs which extend from the top of said compartment, a space of about 1 mm to about 3 mm is left between the end of the rib and the top of said compartment so as to allow gas bubbles to escape.

The panels may be heat-sealed to the cover at the same time as the case. The plastics used may be chosen from polypropylene, and polypropylene copolymers, e.g. ABS, etc.

In a preferred embodiment, a water tank is interposed between each of said orifices (inlet and outlet) and the circulation compartment.

The water tank may be integrated into the heat-sealed panel, or it may be integrated into the case, either on the longitudinal wall carrying the panel, or on the lateral wall that is adjacent to the wall carrying the panel.

For reasons of compactness, it is preferable for the fluid inlet orifice and the fluid outlet orifice to be situated in the cover. The cover then carries the pipe couplings on which fluid feed pipes can be connected.

Other characteristics and advantages of the present invention will appear on reading the following description of embodiments given by way of non-limiting example and with reference to the accompanying drawings, in which:

FIGS. 8, 9, and 10 are fragmentary perspective views showing three variants of the cooling device of the invention in more detail.

Figure 1:
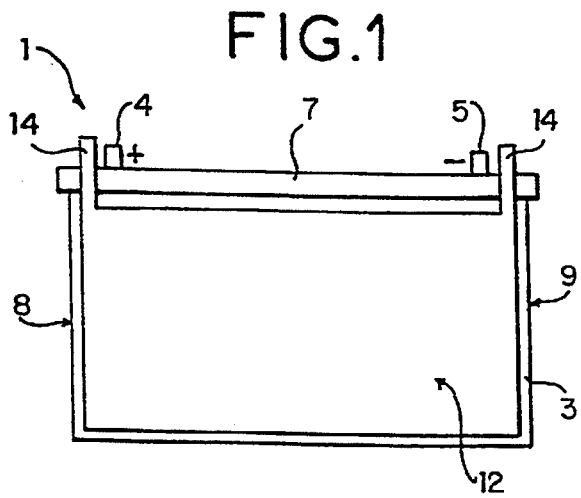
FIG. 1 is a diagrammatic longitudinal elevation view of a battery of the invention.
Figure 2:
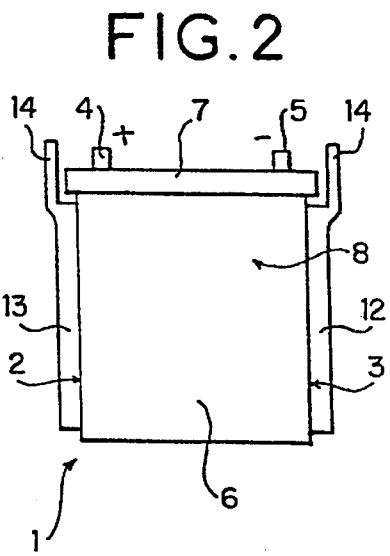
FIG. 2 is a diagrammatic lateral elevation view of the battery shown in FIG. 1.

FIGS. 1 and 2 show a storage cell battery unit 1 of the invention. In particular the battery may comprise lead-acid, nickel-cadmium, nickel-metal hydride, or nickel-zinc storage cells. Its housing is made of plastic, and is constituted by a case 6 and a cover 7 that are heat-sealed together. The longitudinal walls are referenced 2 and 3, the lateral walls are referenced 8 and 9, and the terminals are referenced 4 and 5.

In accordance with the invention, two panels 12 and 13 made of plastic are heat-sealed in fluid-tight manner onto the longitudinal walls 2 and 3. The panels co-operate with the corresponding walls to delimit fluid-circulation compartments. Input and output orifices 14 for the fluid are provided at the top of the compartments. The fluid is, for example, a mixture of water and of ethylene glycol, with an ethylene glycol concentration lying in the range 20% to 35% by mass. For example, the flow-rate is about a few tens of liters per hour.

Figure 3:
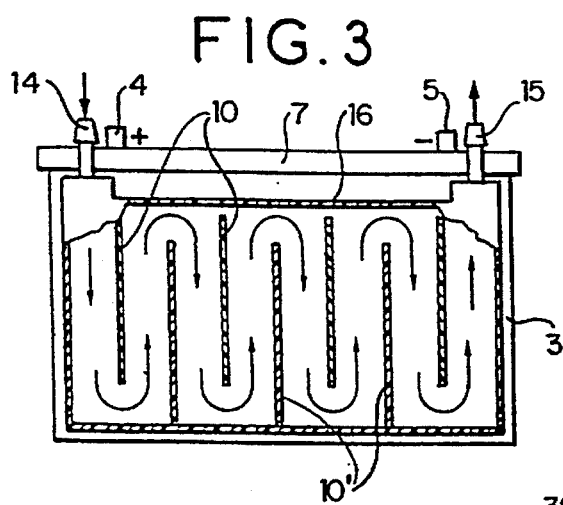
FIG. 3 is diagrammatic cut-away longitudinal view showing the structure of the baffles inside a fluid circulation compartment belonging to a battery of the invention.

To make cooling even more effective each of the walls 2 and 3 of the battery is provided with a series of four ribs 10 and a series of three ribs 10' (cf FIG. 3) which are also heat-sealed to the panel 12, and which define baffles for the circulation of the fluid, as indicated by the arrows.

Ribs 10' extend from the bottom of the compartment. Ribs 10 are not in contact with the top edge 16 of the compartment. They are offset therefrom by in the range 1 mm to 3 mm, so as to enable gas bubbles to escape without disturbing the flow of the cooling liquid.

The ribs further offer the advantage of stiffening the panels and of preventing them from being distorted under the effect of the fluid pressure that is essential to the circulation of the fluid.

The number of ribs and the slope thereof may be chosen as a function of the characteristics desired for the flow of the fluid.

Figure 4A:
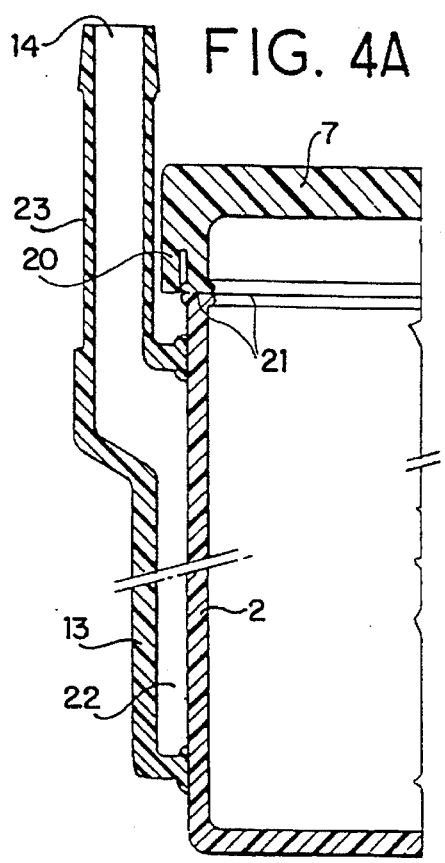
FIGS. 4A and 4B are fragmentary diagrams respectively showing a section view and a plan view of a variant of the battery of the invention.
Figure 4B:
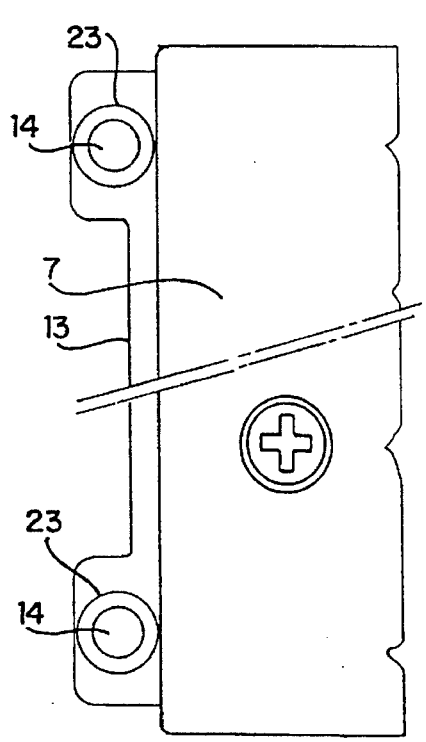

FIGS. 4A and 4B show, in more detail, the wall 2 of the case and the cover 7 heat-sealed thereon. The line of fused plastic 21 is hidden by a rim 20 on the cover, which rim creates extra thickness, e.g. 2.5 mm, relative to the outside face of the wall 2, the wall in turn having a thickness of 2 mm. The panel 13 is 2.5 mm thick and it delimits a compartment 22 that is 3 mm thick. At the orifice 14, the panel 13 is extended by a pipe coupling 23 having an inside diameter of 5 mm and creating extra thickness of 13.5 mm relative to the inside face of the wall 2.

Figure 5A:
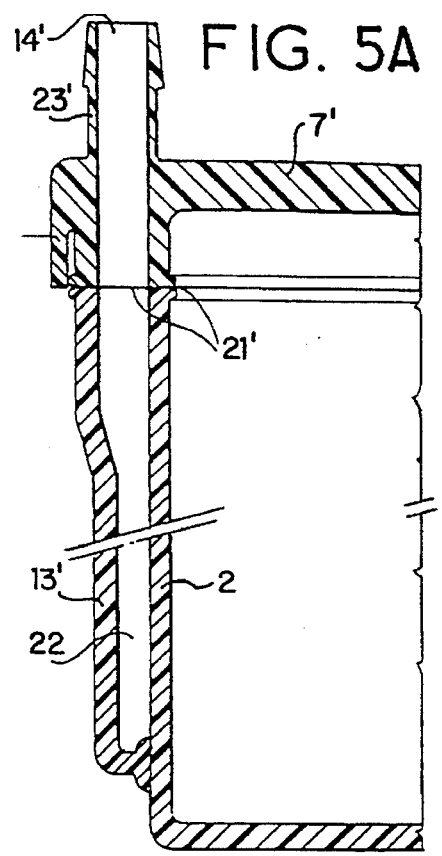
FIGS. 5A and 5B are analogous to FIGS. 4A and 4B, for another variant of the battery of the invention.
Figure 5B:
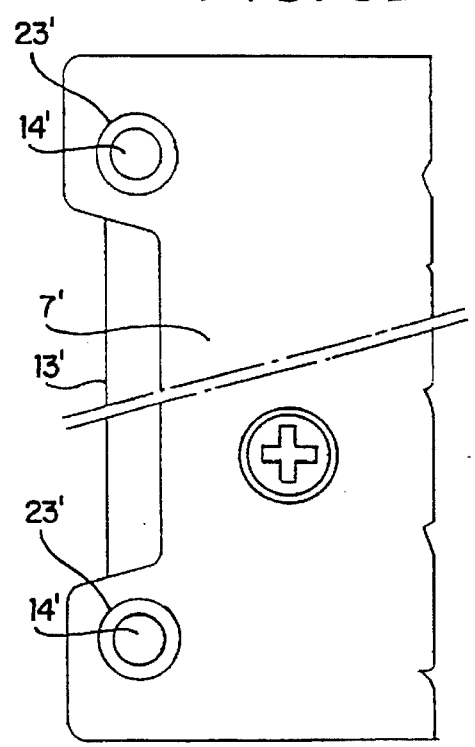

FIGS. 5A and 5B show the wall 2 and a cover 7' associated with a panel 13'. The panel 13' and the wall 2 are heat-sealed simultaneously to the cover 7' thereby forming a line of fused plastic 21' hidden by a rim 20' on the cover. The orifice 14' and the pipe coupling 23' are then part of the cover 7'. In this case, the extra thickness created relative to the inside face of the wall 2 is only 12 mm.

In another embodiment, the rim 20 or 20' may be smaller, or else it may be omitted.

If the thickness of the fluid feed pipe connected to the pipe couplings 23 and 23' is taken into account, the overall extra thickness is not increased in the variant shown in FIGS. 5A and 5B, whereas it is increased in the variant shown in FIGS. 4A and 4B.

Figure 10:
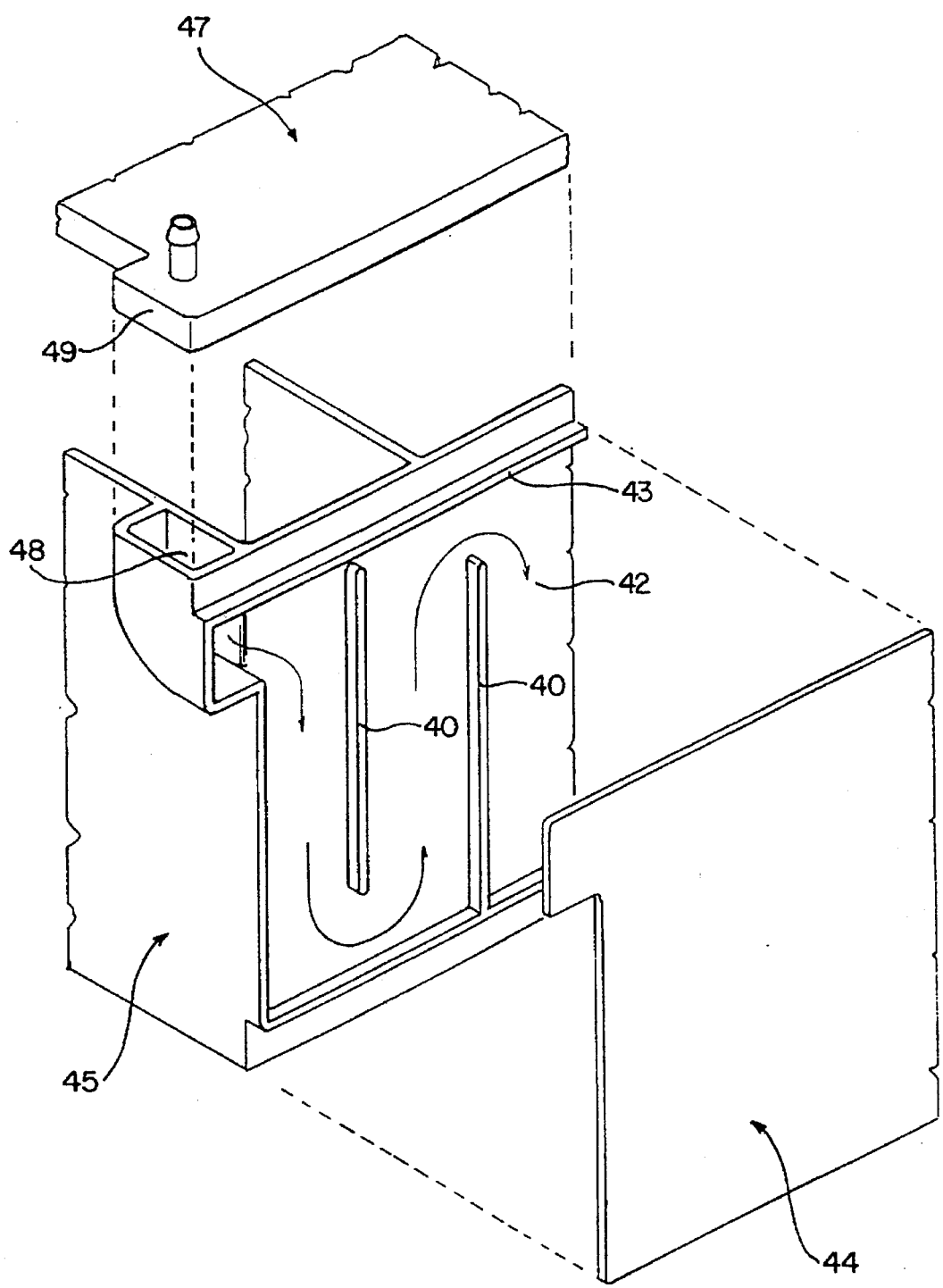

FIGS. 8, 9 and 10 show three variants of the cooling device in which the pipe coupling is incorporated into the cover of the battery.

FIG. 8 shows a battery unit case 36 having a longitudinal wall 32 provided with ribs 30 and with a rim 34, a panel 35 being heat-sealed onto the ribs and onto the rim. A water tank 38 communicating with the compartment delimited by the wall 32 and by the panel 35 is integrated by molding into the top portion of the case 36. The cover 37 has a projection 39 carrying a pipe coupling 33 and fitting over the water tank 38; the resulting assembly is heat-sealed in fluid-tight manner.

In FIG. 9, instead of being an integral part of the case 36, the water tank 38' is an integral part of the panel 35' which is mounted and heat-sealed on the case, and which itself carries ribs 30'.

Figure 6:
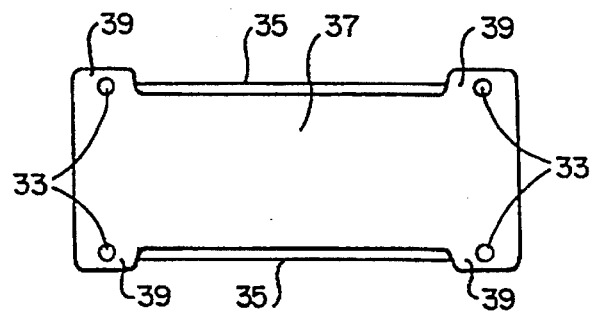
FIGS. 6 and 7 are diagrammatic plan views of two variants of the battery of the invention.

The variants shown in FIGS. 8 and 9 appear in a plan view in FIG. 6.

Figure 7:
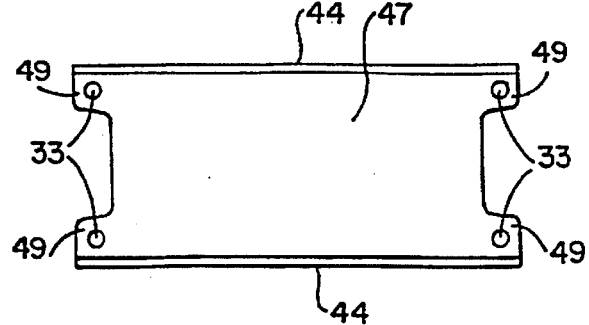

In the variant shown in FIG. 10, which appears in a plan view in FIG. 7, the longitudinal wall is referenced 42, and the ribs on the wall that are designed to receive a panel 44 are referenced 40. The heat-sealed edge is referenced 43.

Instead of being situated on the longitudinal wall 42 of the case, as it is in FIG. 8, the water tank 48 which communicates with the circulation compartment is situated on the adjacent lateral wall 45. The cover 47 then has a projection 49 covering the water tank 48.

Naturally, the invention is not limited to the above-described embodiments. Without going beyond the ambit of the invention, any means may be replaced with equivalent means, in particular with a view to optimizing the compactness of the cooling device.

We claim:

1. A storage battery unit having a plurality of cells disposed within a housing made of plastic and having two opposite walls comprising a case and a cover heat-sealed thereon and a cooling device that uses a circulating fluid, wherein said cooling device includes two panels made of plastic and heat-sealed in fluid-tight manner to respective ones of two opposite walls of said housing, each of the panels being shaped to cooperate with the corresponding wall to delimit a circulation compartment having an inlet orifice and an outlet orifice for said fluid at the top of the compartment, at least one of said orifices being defined by the contour of at least one of said walls and said panels.

2. A storage cell battery according to claim 1, characterized by the fact that said wall and/or said panel is provided with a plurality of ribs that form baffles for the circulation of said fluid in said compartment.

3. A storage cell battery according to claim 2, characterized by the fact that, for each of those of said ribs which extend from the top of said compartment, a space of about 1 mm to about 3 mm is left between the end of the rib and the top of said compartment so as to allow gas bubbles to escape.

4. A storage cell battery according to claim 1, characterized by the fact that said inlet orifice and said outlet orifice for the fluid are situated in said cover.

5. A storage cell battery according to claim 4, characterized by the fact that said panels and said case are heat-sealed to said cover simultaneously.

6. A storage battery unit having a plurality of cells disposed within a housing made of plastic and having two opposite walls comprising a case, a cover, and first heat sealing means for securing the cover on the case, and a cooling device that uses a circulating fluid, wherein said cooling device includes two panels made of plastic, and second means individually heat sealingly securing each of said two panels in a fluid-tight manner to respective ones of two opposite walls of said housing, each of the panels being shaped to cooperate with the corresponding wall to delimit a circulation compartment having an inlet orifice and an outlet orifice for said fluid at the top of the compartment, at least one of said orifices being defined by the contour of at least one of said walls and said panels.

* * * * *